(12) United States Patent
Gerber et al.

(10) Patent No.: US 8,631,812 B2
(45) Date of Patent: Jan. 21, 2014

(54) COMPRESSOR THROTTLING VALVE ASSEMBLY

(75) Inventors: Thomas E. Gerber, Williamsville, NY (US); Mark R. Sabin, Sanborn, NY (US)

(73) Assignee: Cameron International Corporation, Houston, TX (US)

( * ) Notice: Subject to any disclaimer, the term of this patent is extended or adjusted under 35 U.S.C. 154(b) by 246 days.

(21) Appl. No.: 13/104,328

(22) Filed: May 10, 2011

(65) Prior Publication Data

US 2011/0209767 A1    Sep. 1, 2011

Related U.S. Application Data

(60) Division of application No. 12/643,262, filed on Dec. 21, 2009, now Pat. No. 7,971,600, which is a continuation of application No. 12/534,822, filed on Aug. 3, 2009, now Pat. No. 7,637,282, which is a continuation of application No. 11/200,613, filed on Aug. 10, 2005, now Pat. No. 7,568,503.

(51) Int. Cl.
*F17D 3/00* (2006.01)
*F16K 11/20* (2006.01)

(52) U.S. Cl.
USPC .......................................... 137/14; 137/637.3

(58) Field of Classification Search
USPC ............................ 137/637.2, 637.3, 1, 12, 14; 251/281–283, 212
See application file for complete search history.

(56) References Cited

U.S. PATENT DOCUMENTS

| 4,532,961 | A | * | 8/1985 | Walton et al. ................. 251/212 |
| 4,545,742 | A |   | 10/1985 | Schaefer |
| 4,662,190 | A |   | 5/1987 | Tischer |
| 4,682,674 | A | * | 7/1987 | Schmidt ........................ 251/212 |
| 4,968,221 | A | * | 11/1990 | Noll ........................... 137/625.33 |
| 4,972,867 | A |   | 11/1990 | Ruesch |
| 5,042,531 | A | * | 8/1991 | Foster et al. ................. 251/193 |
| 5,345,812 | A |   | 9/1994 | Haboian |
| 6,244,289 | B1 |   | 6/2001 | Hopfe et al. |
| 6,397,892 | B1 |   | 6/2002 | Pyle et al. |
| 6,425,283 | B1 |   | 7/2002 | Muller |
| 6,453,658 | B1 |   | 9/2002 | Willis et al. |
| 7,568,503 | B2 |   | 8/2009 | Gerber et al. |
| 7,637,282 | B2 |   | 12/2009 | Gerber et al. |
| 2010/0096577 | A1 |   | 4/2010 | Gerber et al. |

* cited by examiner

*Primary Examiner* — Kevin Lee
(74) *Attorney, Agent, or Firm* — Fletcher Yoder, P.C.

(57) ABSTRACT

A throttling valve assembly has an outer housing that is sealed. An actuator is connected to a pressure balanced shaft that extends into the housing to operate a plurality of linkages that can rotate blades in tandem. With the surrounding housing sealed, the shaft penetrations of the blade support shafts no longer need seals or a purge system to supply process gas during times of reduced pressure in situations with the blades nearly closed. A pressure equalization system has balance passages internal to the housing to allow flow from higher pressure zones to lower pressure zone of the process gas so as to avoid creation of a condition that can draw air into any zones of reduced pressure in the housing.

23 Claims, 4 Drawing Sheets

COMPRESSOR THROTTLING VALVE ASSEMBLY

CROSS REFERENCE TO RELATED APPLICATIONS

This application is a divisional of U.S. patent application Ser. No. 12/643,262, filed on Dec. 21, 2009, issued as U.S. Pat. No. 7,971,600, and entitled "Compressor Throttling Valve Assembly", which is herein incorporated by reference in its entirety, and which is a continuation of U.S. patent application Ser. No. 12/534,822, filed on Aug. 3, 2009, issued as U.S. Pat. No. 7,637,282 on Dec. 29, 2009, and entitled "Compressor Throttling Valve Assembly", which is herein incorporated by reference in its entirety, and which is a continuation of U.S. patent application Ser. No. 11/200,613, filed on Aug. 10, 2005, issued as U.S. Pat. No. 7,568,503 on Aug. 4, 2009, and entitled "Compressor Throttling Valve Assembly," which is herein incorporated by reference in its entirety.

FIELD OF THE INVENTION

The field of this invention is throttling valves and more particularly those used on centrifugal compressors to match output to system demands.

BACKGROUND OF THE INVENTION

Centrifugal compressors are frequently packaged in multiple stages using a common drive including associated controls. One type of control involved throttling the suction to the initial stage so as to match the output of the compressor to the system demands. Doing this avoids the cost of energy to power the compressor units at output levels not required from the system. The nature of the performance curve of centrifugal compressors is that their output flow and pressure are related and can be varied by a throttling assembly typically mounted at the suction to the first stage. These throttling assemblies have been designed in the past using a series of blades that rotate 90 degrees between the open and closed position. Typically each blade has a pair of end shafts that extend out of the inlet piping going to the first stage. Each such shaft extension through the piping system was provided with a shaft seal and a purge system. The purpose of the purge system was to keep gasses from escaping these shaft seals particularly in applications where inlet pressures in a particular system ran normally at elevated pressures that were raised to an even higher pressure by the compressor system. The purge system served a purpose of avoiding sucking in surrounding air in some systems. In conditions of high turndown when the blades are operating close to the fully closed position, it was possible for the compressor to draw the pressure down to negative values. In those cases, in order to avoid drawing air into the process gas being compressed, the process gas was hooked to the purge system. If a negative pressure situation occurred, the process gas would be sucked in around shaft seals located at each end of each blade. Depending on the inlet piping size, there could be several blades rotating in tandem with each one having a connection to the purge system.

The blades each had a dedicated linkage typically connected to a rotating ring that was turned by an actuator, typically operated by pneumatic pressure.

The problems with the prior design were numerous. As mentioned above there was the concern of leakage at every shaft seal of every blade and the need to hook up a purge system to each potentially leaking seal. The present invention eliminates the concerns of the previous designs by enclosing the inlet pipe with the blades inside in a surrounding housing. In this approach the leakage at blade shaft seals becomes irrelevant as a surrounding housing contains the process gas. The design further extends a balanced driving piston that is powered by the external pneumatic actuator into the interior of the housing. Balancing the piston reduces actuator output requirements be eliminating internal housing pressure as a load on the drive stem. Multiple seals are available on the drive stem penetrations of the housing to further enhance reliable operation. One or more internal passages remain open between the upstream and downstream sections of the housing on either side of the blades. Thus, when high turndowns with nearly closed blades bring the downstream pressure down to negative values due to continuing compressor operation, the passages serve an equalization function to avoid sucking air into the housing. These and other features of the present invention will be more readily understood from a review of the description and drawings of the preferred embodiment and the claims, which appear below.

SUMMARY OF THE INVENTION

A throttling valve assembly has an outer housing that is sealed. An actuator is connected to a pressure balanced shaft that extends into the housing to operate a plurality of linkages that can rotate blades in tandem. With the surrounding housing sealed, the shaft penetrations of the blade support shafts no longer need seals or a purge system to supply process gas during times of reduced pressure in situations with the blades nearly closed. A pressure equalization system has balance passages internal to the housing to allow flow from higher pressure zones to lower pressure zone of the process gas so as to avoid creation of a condition that can draw air into any zones of reduced pressure in the housing.

DETAILED DESCRIPTION OF THE PREFERRED EMBODIMENT

Figure 1:
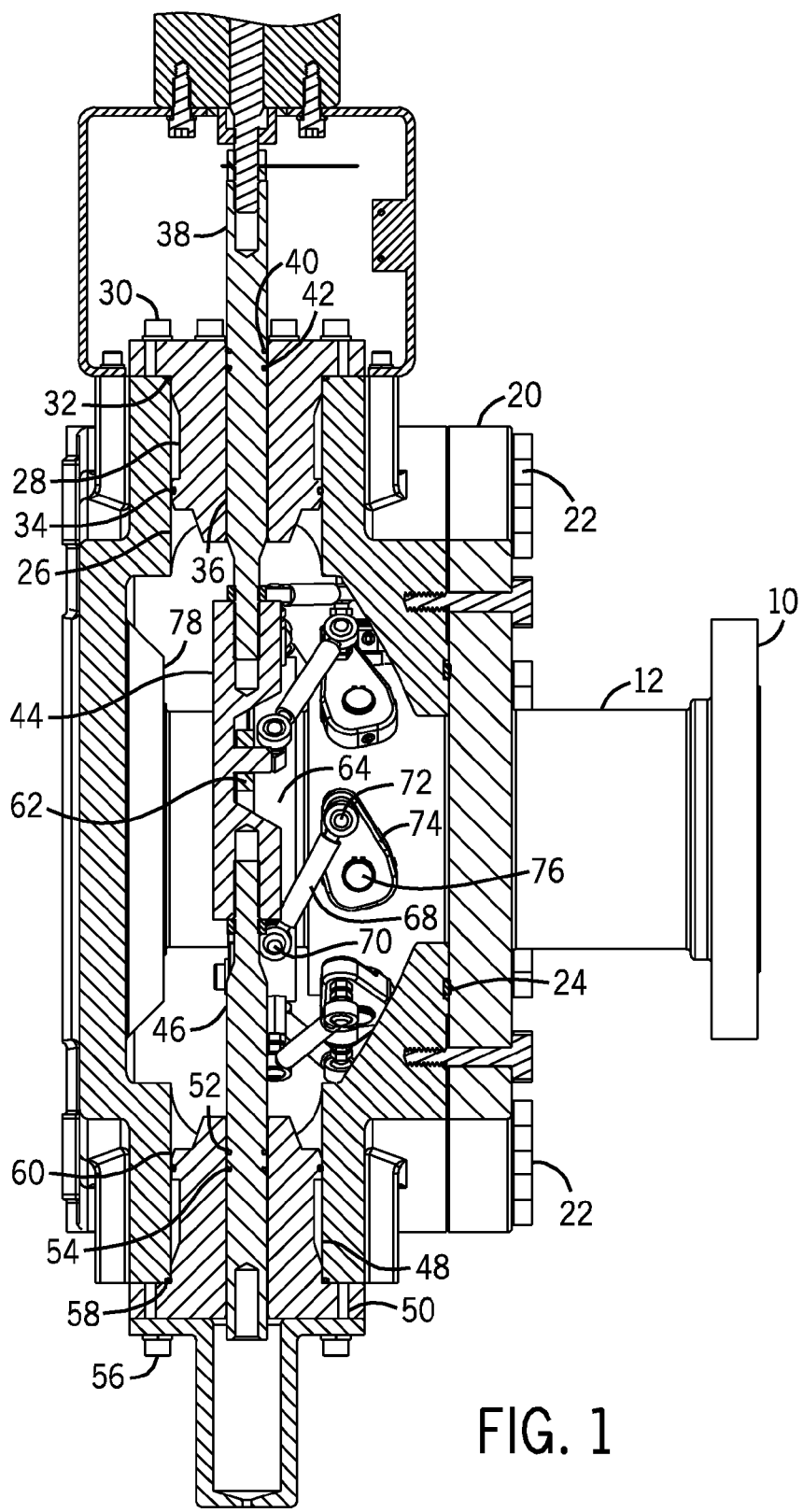
FIG. 1 is a section view through the outer housing showing the shaft and linkage system that it operates.
Figure 4:
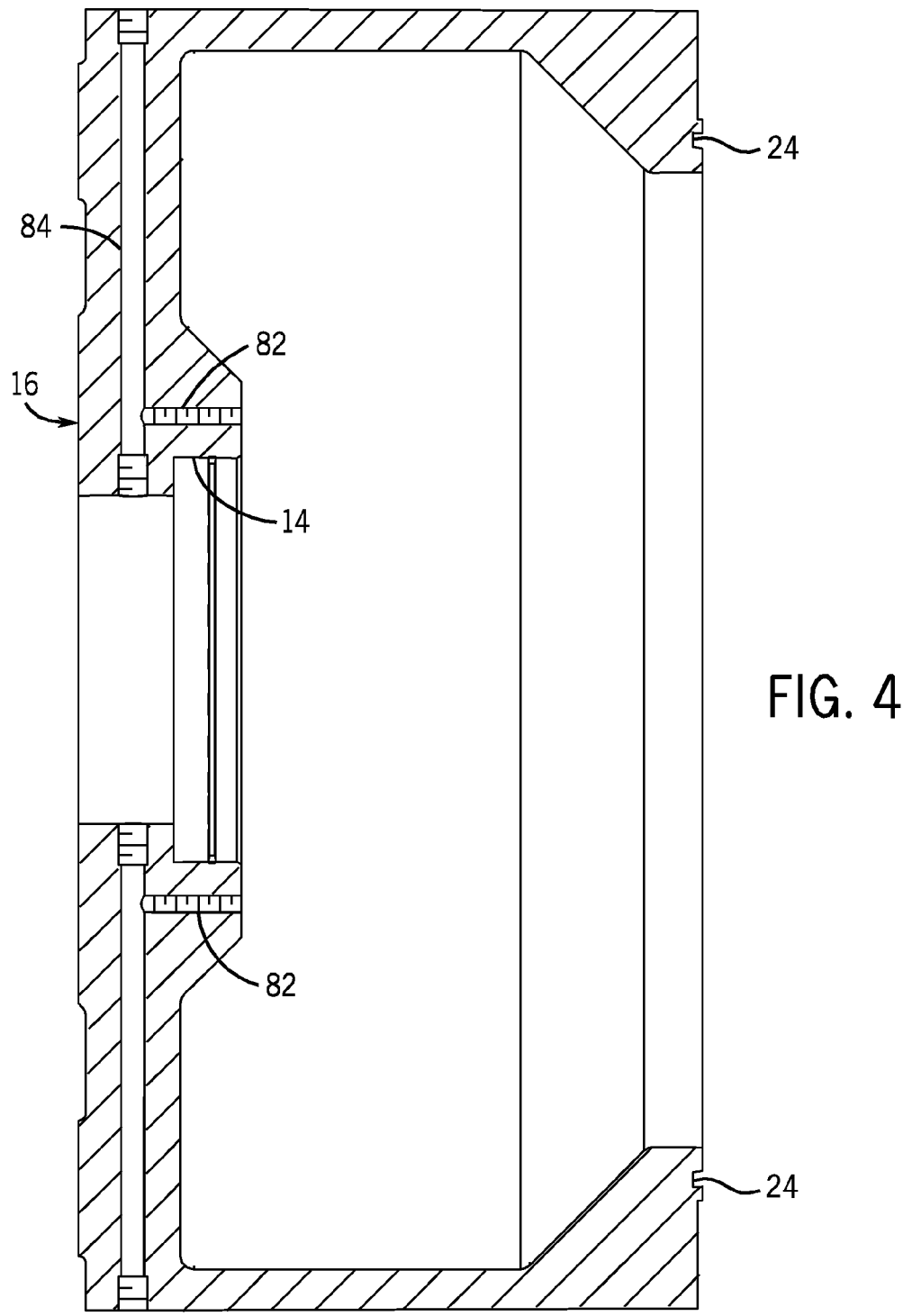
FIG. 4 is a section view through the outer housing.

Referring to FIG. 1 a compressor system (not shown) has its inlet attached at flange 10. Flange 10 is connected to inner housing 12 which is essentially a section of pipe that extends into a recess 14 (see FIGS. 2 and 4) of outer housing 16 and is sealed to said recess 14 with a seal 18. Attached to inner housing 12 is a flange 20 which is secured to outer housing 16 by bolts 22. A seal 24 seals the flange 20 to the outer housing 16. Outer housing 16 has an upper opening 26 which is closed off by a plug 28 secured in a sealing relationship due to bolts 30 and seals 32 and 34. A bore 36 accepts upper rod 38 which can translate in the bore 36 while being sealed to it by redundant seals 40 and 42. A connector 44 attaches lower rod 46 to upper rod 38. Opening 48 is opposed to opening 26 and accepts a plug 50 through which the lower rod 46 translates while in a sealed relationship due to redundant seals 52 and 54. Plug 50 is retained in a sealing relation to the outer housing 16 by use of bolts 56 and seals 58 and 60.

Figure 2:
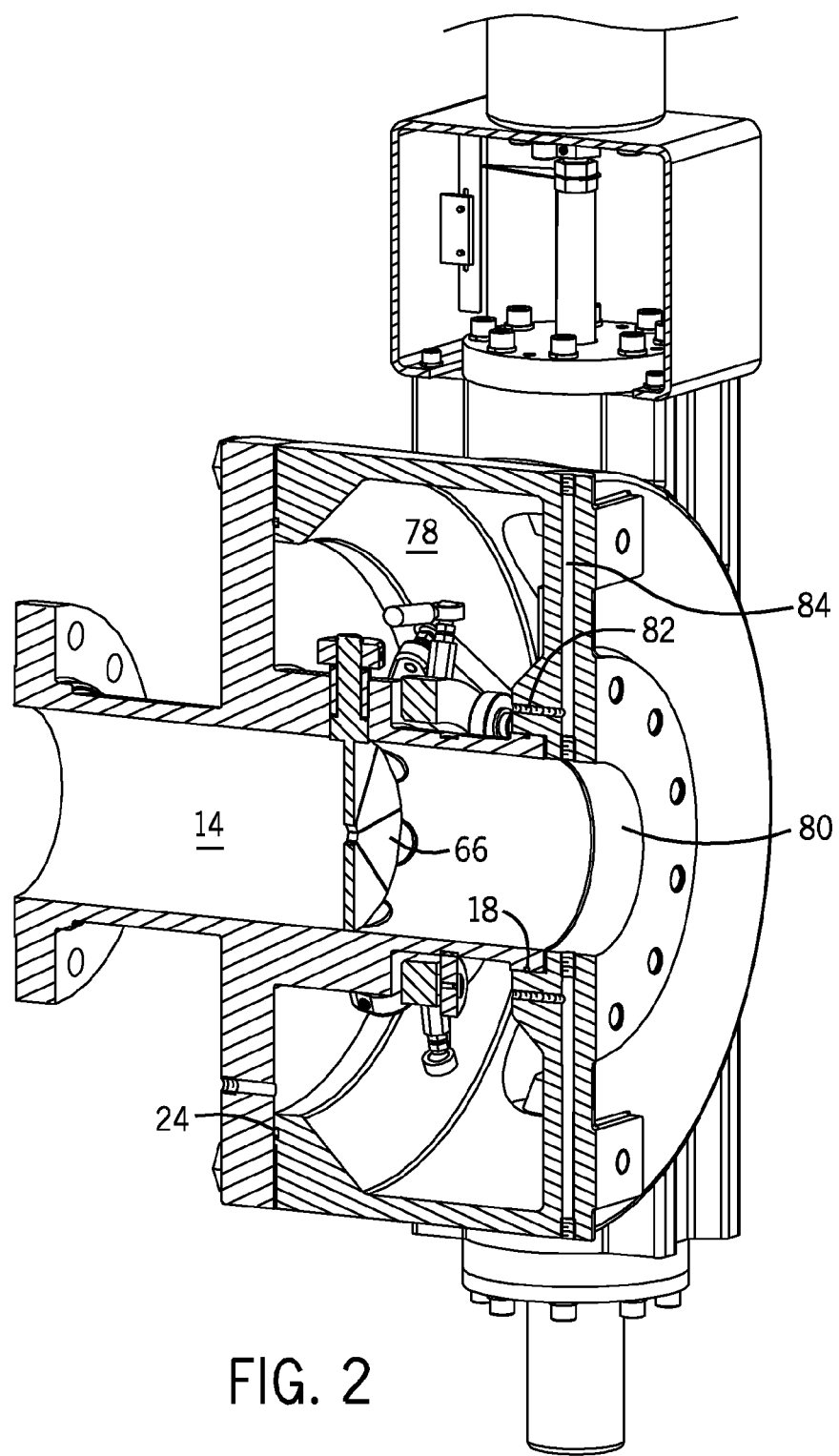
FIG. 2 is a section through both outer and inner housings showing the blades.
Figure 3:
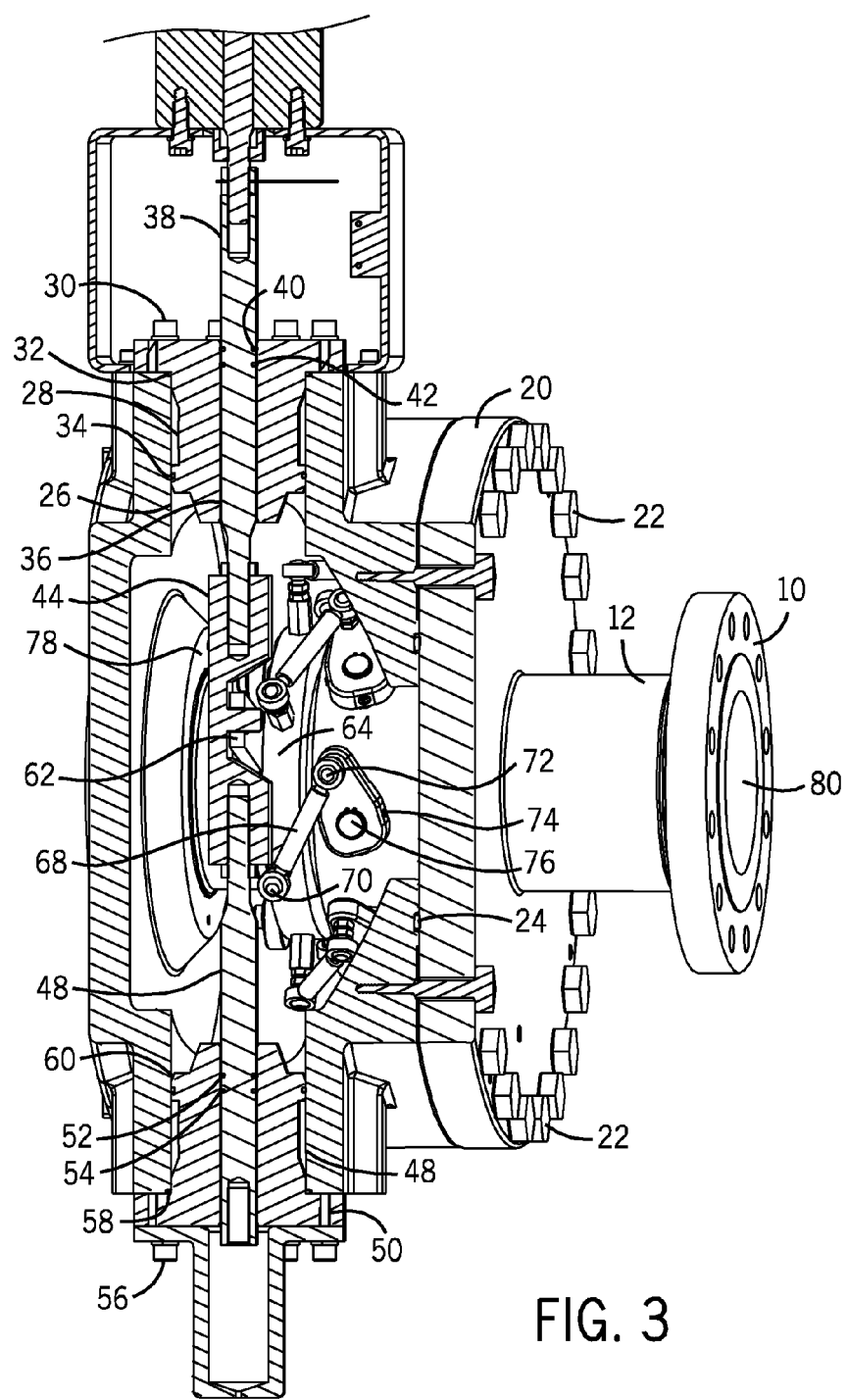
FIG. 3 is another section showing the manner the linkages are operated in tandem by the shaft.

Connector 44 is engaged to an arm 62 that extends radially from ring 64. Translation of connector 44 results in rotation of ring 64. Each blade 66 shown in FIG. 2 is connected to a linkage that comprises a link 68 pinned at 70 to ring 64 and pinned at 72 to link 74. Shaft 76 is rotated with link 74 and the blade 66 turns when shaft 76 turns. All shafts 76 are designed to rotate in tandem to operate each blade 66 in tandem and uniformly. FIG. 2 shows the blades 66 in the closed position.

The extensions of shafts 76 through inner housing 12 are no longer needed to be sealed as in the prior art. This is because there is an outer housing 16 that has its orifices sealed with flange 20, plug 28 and plug 50.

An annular space 78 is created between outer housing 16 and inner housing 12. Outer housing 16 has an upstream inlet 80 that leads to the blades 66 in the inner housing 12. Pressure in inlet 80 communicates through passage 82 into the annular space 78. That way when the blades 66 go toward the closed position reducing the pressure in the inner housing 12 near flange 10 gasses from annular space 78 flows around shafts 76 so that outside air is not drawn into the inner housing 12. Passage 84 is provided and can be blanked off on outer housing 16. Alternatively, a purge system that can deliver process gas into annular space 78 may still be wanted by some users and they can use passage 84 for that very purpose.

Those skilled in the art will appreciate that the pressure balanced design of upper rod 38 and lower rod 46 makes the driving assembly insensitive to annular space 78 pressure. The redundancy of seals such as 40 and 42 means more hours of reliable operation and less downtime. The pressure balanced design allows the use of a smaller actuator connected to upper rod 38. The pressure equalizing system has no moving parts and equalizes pressure differentials induced by reorientation of the blades 66 fairly fast. The design eliminates shaft seals on the rotating blade or blades 66. The two piece design of the outer housing 16 facilitates maintenance and assembly operations. Seals on rods 38 and 46 can be changed without taking the housing 16 out of the suction piping system to the compressor. Thrust loads on the shafts 76 are reduced if not eliminated since annular space 78 and inner housing 12 quickly equalize to a common pressure upstream of the blades 66.

While the preferred embodiment has been set forth above, those skilled in art will appreciate that the scope of the invention is significantly broader and as outlined in the claims which appear below.

The invention claimed is:

1. A system, comprising:
a flow control device, comprising:
a conduit comprising a first wall surrounding a fluid path;
a flow control member disposed internal to the conduit along the fluid path;
a chamber disposed external to the conduit between the first wall and a second wall; and
a shaft coupled to the flow control member, wherein the shaft is configured to move the flow control member between an open position and a close position, the shaft extends through the first wall from the fluid path to the chamber, and the shaft has a shaft axis oriented crosswise to a flow axis along the fluid path.

2. The system of claim 1, comprising a plurality of shafts and a plurality of flow control members, wherein each flow control member is disposed internal to the conduit along the fluid path, each shaft extends through the first wall from the fluid path to the chamber, and each shaft has a corresponding shaft axis oriented crosswise to the flow axis along the fluid path.

3. The system of claim 2, wherein the plurality of shafts and the plurality of flow control members are disposed at a common axial position along the fluid path.

4. The system of claim 2, comprising a common actuator coupled to the plurality of shafts within the chamber.

5. The system of claim 4, wherein the chamber comprises an annular chamber disposed about the conduit between the first and second walls, the common actuator comprises a ring disposed about the conduit in the annular chamber, and the ring is coupled to each shaft.

6. The system of claim 5, wherein the common actuator comprises a drive shaft coupled to the ring.

7. The system of claim 1, comprising a member coupled to the shaft within the chamber, wherein the chamber maintains a constant volume during movement of the member within the chamber to drive the shaft.

8. The system of claim 7, wherein the member comprises first and second portions, the first portion moves into the chamber while the second portion moves out of the chamber, and the first portion moves out of the chamber while the second portion moves into the chamber.

9. The system of claim 8, wherein the member comprises at least one shaft, the first portion of the member comprises a first end portion of the at least one shaft, and the second portion of the member comprises a second end portion of the at least one shaft.

10. The system of claim 1, wherein the shaft is not sealed relative to the first wall of the conduit.

11. The system of claim 1, comprising a first passage through the conduit from the fluid passage to the chamber, wherein the first passage is configured to enable pressure from the fluid path to pressurize the chamber.

12. The system of claim 11, wherein the first passage is upstream from the flow control member, the flow control device comprises a second passage from the chamber through the conduit to the fluid path, and the shaft extends through the second passage.

13. A system, comprising:
a flow control device, comprising:
a fluid conduit;
an element disposed inside the fluid conduit;
a chamber surrounding the fluid conduit; and
an actuator;
an intermediate structure coupled to the element and the actuator, wherein the intermediate structure is disposed in the chamber, the actuator is configured to move the element via movement of the intermediate structure in the chamber, and the chamber maintains a constant volume during movement of the element in the fluid conduit in response to movement of the intermediate structure.

14. The system of claim 13, wherein the intermediate structure comprises first and second portions, the first portion moves into the chamber while the second portion moves out of the chamber, and the first portion moves out of the chamber while the second portion moves into the chamber.

15. The system of claim 13, comprising at least one passage extending between the fluid conduit and the chamber.

16. The system of claim 15, comprising a housing surrounding the fluid conduit to define the chamber, wherein the housing is sealed relative to an external environment.

17. The system of claim 13, wherein the intermediate structure comprises a drive shaft, a ring coupled to the drive shaft, and a plurality of linkages coupled to the ring, wherein the plurality of linkages are coupled to a plurality of elements disposed inside the fluid conduit.

18. The system of claim 13, wherein the element is movable only within the fluid conduit.

19. A method, comprising:
    actuating a valve member disposed internal to a fluid conduit from a chamber disposed external to the fluid conduit; and
    equalizing pressure of the chamber relative to the fluid conduit during actuation of the valve member.

20. The method of claim 19, comprising moving a first portion of an intermediate structure into the chamber while moving a second portion of the intermediate structure out of the chamber, and moving a first portion of the intermediate structure out of the chamber while moving a second portion of the intermediate structure into the chamber, wherein the intermediate structure is coupled to the valve member and an actuator.

21. The method of claim 20, wherein the intermediate structure comprises at least one shaft.

22. The method of claim 19, wherein equalizing pressure comprises enabling fluid flow through a passage between the chamber and the fluid conduit.

23. The method of claim 19, wherein equalizing pressure comprises equalizing pressure of the chamber relative to a region of the fluid conduit upstream from the valve member.

* * * * *